United States Patent [19]

Morris et al.

[11] Patent Number: 4,524,539
[45] Date of Patent: Jun. 25, 1985

[54] THERMOSTATIC FISHING DEVICE

[76] Inventors: Robert C. Morris, 98 Emmans Rd., Ledgewood, N.J. 07852; Russell S. Shelton, 9 Park Ave., Flanders, N.J. 07836

[21] Appl. No.: 560,879

[22] Filed: Dec. 13, 1983

Related U.S. Application Data

[63] Continuation-in-part of Ser. No. 229,134, Sep. 3, 1981, abandoned.

[51] Int. Cl.³ .................... A01K 91/06; A01K 97/00
[52] U.S. Cl. .................................. 43/44.87; 43/43.13
[58] Field of Search ............... 43/4, 43.13, 44.87, 43/44.91, 4.5, 42.23, 42.29; 24/243 R

[56] References Cited

U.S. PATENT DOCUMENTS

| Re. 28,262 | 12/1974 | Nye | 43/43.13 |
|---|---|---|---|
| 2,377,222 | 5/1945 | Fruth | 24/243 R |
| 2,976,642 | 3/1961 | Wickman et al. | 43/43.13 |
| 3,381,407 | 5/1968 | McDougall | 43/44.91 |
| 3,529,568 | 9/1970 | Quin | 43/4 X |
| 3,796,000 | 3/1974 | Nye | 43/43.13 |
| 3,973,349 | 8/1976 | England | 43/4 X |
| 4,028,839 | 6/1977 | Stubblefield | 43/43.13 |
| 4,079,539 | 3/1978 | Holstein | 43/43.13 |
| 4,161,841 | 7/1979 | Holstein | 43/43.13 |

Primary Examiner—Nicholas P. Godici
Assistant Examiner—M. Jordan
Attorney, Agent, or Firm—Roy M. Porter, Jr.

[57] ABSTRACT

A fishing assembly including a line, a sinker, a fish snare which may include a hook, bait and/or lure, and a leader for said snare, and including a bimetallic member, adapted for changing state in response to the temperature of the water environment in which said assembly is located, is arranged for determining the depth of said line to its junction with said leader whereby said leader is positioned in water of a predetermined temperature.

9 Claims, 12 Drawing Figures

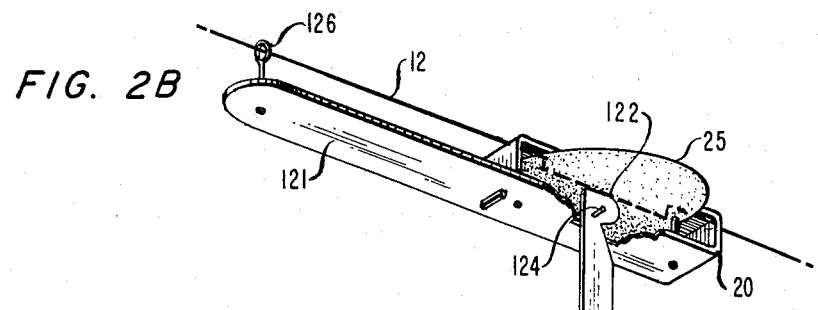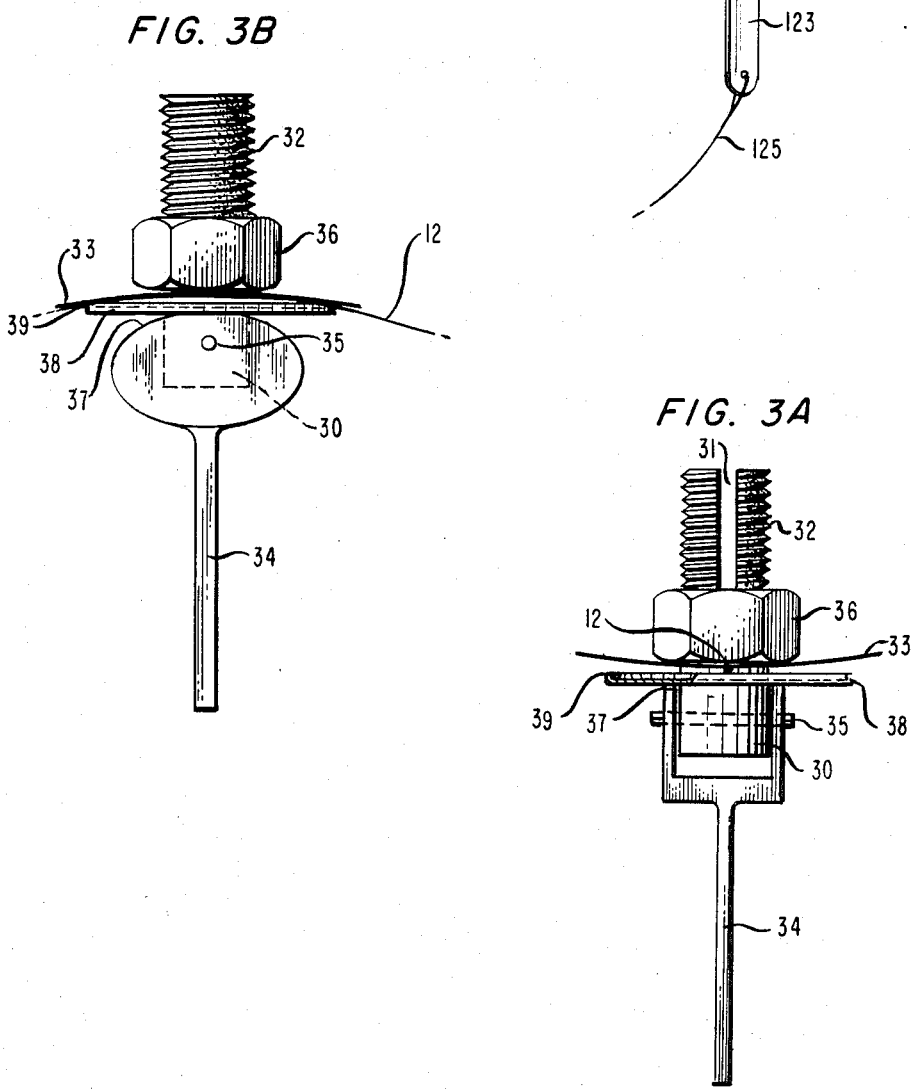

THERMOSTATIC FISHING DEVICE

RELATED APPLICATIONS

This application is a continuation in part of applicants' copending application Ser. No. 06/229,134 filed Sept. 3, 1981 and now to be abandoned.

BACKGROUND OF THE INVENTION

It is well known by biologists and fishermen that water temperature exerts a strong influence on the ranging and feeding habits of fresh and salt water game fish and that a given species of fish will tend to be found most frequently in a body of water characterized by a fairly narrow temperature range. Thus, there exists a wide variety of devices used to position fishing baits at various water depths ranging from the simple lead weight to fairly elaborate trolling devices incorporating heavy weights with remote sensing devices attached. The simple sinker provides no indication of temperature and the latter devices are both costly and cumbersome.

SUMMARY OF THE INVENTION

In accordance with the present invention, unique advantage is taken of bimetal elements. These elements have the property of snapping sharply from one configuration to another at a temperature critically determined by the construction of the element. The invention provides structures particularly adapted to contain such an element and to translate the local temperature in the body of water into a mechanical action that automatically determines the depth.

In accordance with one embodiment of the invention the action of the bimetal element stops the descent of a frame carrying the snare and sinker along the line and into the water when the temperature is reached. In another embodiment the action of the bimetal element causes a sudden and more rapid descent of a frame carrying the snare and sinker along the line or an extension thereof and into the water causing a mechanical signal to be returned along the line to the fisherman thus advising him that the proper temperature has been reached.

BRIEF DESCRIPTION OF THE DRAWINGS

FIG. 2B is a perspective view of a modification of FIG. 2;

FIG. 3A and FIG. 3B are respectively front and side views of a second embodiment of the invention, FIG. 3A being in the unclamped condition and FIG. 3B being in the clamped condition;

DETAILED DESCRIPTION OF THE PREFERRED EMBODIMENT

Figure 1:
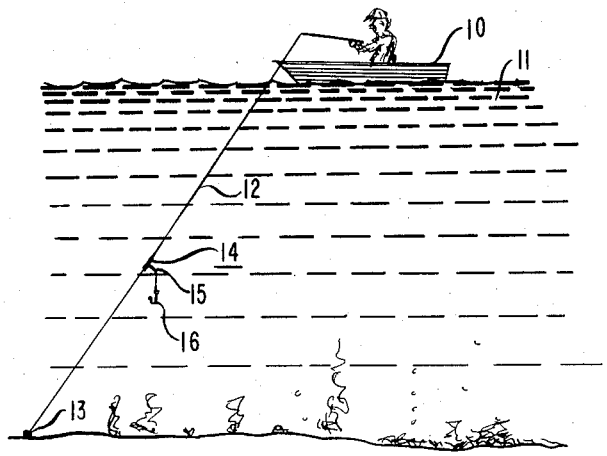
FIG. 1 is a schematic illustration of the environment in which the invention is used.

Referring to FIG. 1, a line clamp in accordance with the invention is shown schematically in the environment in which it is used. Thus, a boat or vessel 10, either still or trolling, is shown on the surface of the body of water 11 from which a fishing line 12 extends to sinker 13 which has been lowered to a point on or near the bottom of water 11. Line clamp assembly 14 forms the junction between line 12 and a leader 15 carrying a second sinker and the fish snare 16 which may include any combination of bait, hook or lure. Assembly 14 has been allowed to descend along line 12 to a predetermined temperature of water body 11.

The temperature at which given species of fish can be found in a body of water is determined by complex interactions of oxygen content, vegetation and food availability, the balance between which is determined by temperature.

By experience, it is known that the preferred water temperature range for various game fish are approximately as follows:

Trout: 50°–55°
Yellow Pike: 55°–60°
Smallmouth Bass: 62°–68°
Largemouth Bass: 65°–70°
Northern Pike: 65°–70°

Figure 2:
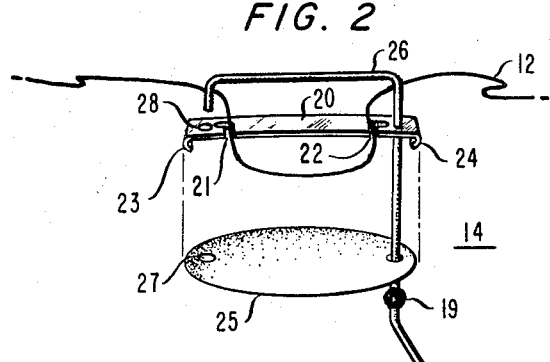
FIG. 2 is an expanded perspective view of one embodiment of the invention.
Figure 2A:
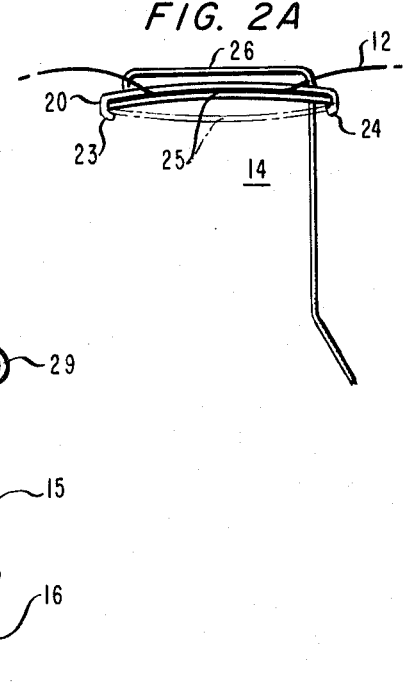
FIG. 2A is a cross-sectional view taken through the structure of FIG. 2 in its assembled and clamped condition.

Referring now to FIG. 2 and FIG. 2A, details of the line clamp assembly 14 of FIG. 1 may be seen. FIG. 2 shows the components in an expanded perspective while FIG. 2A shows a cross section of the assembled components. Assembly 14 comprises a slider frame 20 having a pair of spaced slots 21 and 22 through which line 12 may be threaded. Slider frame 20 is provided with end clamps 23 and 24 suitably arranged to receive the edges of bimetal disc 25. Bimetal disc 25 is of construction readily available on the market and having the property that at one temperature extreme, the surface of disc 25 is cupped spherically in one direction and at the opposite temperature extreme the surface curvature is the reverse. The temperature at which the surface curvature snaps from one configuration to the other is a property of its bimetal construction.

In accordance with the invention, this property is utilized by inserting disc 25 into end clamps 23 and 24 so that its high temperature configuration is concave downward, as shown by the phantom lines in FIG. 2A, and so that it snaps into a concave upward configuration as shown by the solid lines in FIG. 2A, at a much lower temperature designed to be equivalent to the feeding temperature of a particular species of fish. Slider frame 20 is provided with a curvature which substantially matches the upward curvature of disc 25 so that disc 25 is contiguous to frame 20 over a substantial portion of their surfaces. Line clamp 24 is completed by the addition of guide wire 26 which extends through a small hole 27 on one side of disc 25, through an aligned hole 28 in guide frame 20, across the top of guide frame 20, and through corresponding holes on the other side of guide frame 20 and disc 25. A keeper 19 restrains guide wire 26 in this arrangement. This particular configuration of guide wire 26 allows line 12 to be inserted under wire 26 and between guide frame 20, thereafter urged into slots 21 and 22 all as best seen from FIG. 2. When pulled firmly into slots 21 and 22, line 12 is free to slide through slots 21 and 22 but to be securely restrained within them. Remote end of wire 26 includes a loop 29 which connects to the leader 15 which in turn carries sinker and snare 16 which includes the bait, hook or lure. As line clamp 14 descends along the length of line 12, the temperature will be reached at which disc 25 snaps into its upward configuration as in FIG. 2A. This securely clamps line 12 between the surface of disc 25 and slider frame 20 and forms the junction between line 12 and leader 15.

When a fish strikes, the line 12 is reeled in, line clamp 14 will eventually be withdrawn into water of higher temperature. The hysteresis of disc 25 is such that it is unlikely to reverse its curvature. Even if it should, slider assembly 14 will merely slip along line 12 until it is picked up by sinker 13. To avoid this slippage, additional means may be provided to secure the line clamp to the line in response to the pull of the fish. Such an embodiment will now be described in connection with FIG. 2B.

FIG. 2B shows such a line clamp as a modification of the embodiment of FIG. 2. Corresponding reference numerals have been used to describe corresponding components. Modification will be seen to reside in the extension 120 of slider frame 20 around to the other side of disc 25 to provide a guide 121 looping line 12 with hook 126. A lever arm 123 having an end thereof formed as a cam surface 122 is suitably secured to extension 120 by pin 124 such that a movement of arm 123 causes rotation about pin 124 thereby moving cam surface 122 into compression of disc 25 against frame 20. Leader 125 is connected to the remote end of arm 123 so that a pull upon arm 123 reacting against the stability provided by guide 121 on line 12, moves cam surface 122 into position to tightly clamp line 12.

Referring to FIGS. 3A and 3B, a second and different embodiment of line clamp is shown. FIG. 3A is a front view showing the unclamped condition and FIG. 3B is a side view showing the clamped condition. The combination is assembled upon a cylindrical rod 30 having a diametrical slot 31 extending for a portion of its length and external threads 32 substantially co-extensive with slot 31. A shank portion of rod 30 carries a cam arm 34 secured to rod 30 by pin 35 such that a movement of cam arm 34 causes rotation about pin 35 thereby raising and lowering the cam surface 37 relative to rod 30. A non-flexible washer 38, preferably, although not necessarily, having a raised lip 39 about its circumference is first installed about rod 30 to rest upon cam surface 37. Fishing line 12 is next inserted into slot 31. Then bimetal disc 33, having a central hole and a diameter generally corresponding to washer 38, is installed upon rod 30 on top of line 12. Finally, threaded nut 36 is received upon threads 32 and loosely tightened upon disc 33.

Disc 33 is installed so that its high temperature configuration is convex as viewed from washer 38 as shown only in FIG. 3A. Thus, line 12 is free to slide through slot 31, and between disc 33 and washer 39. When the assembly slides into water having a sufficiently lower temperature, disc 33 reverses its curvature to that shown in FIG. 3B, securely clamping line 12 between the outer periphery of disc 33 and lip 39 of disc 38.

When a fish is snared, any random jerk or pull upon cam arm 34 as the line is reeled in will rotate cam surface 37 against washer 38, raising it into a tightly locked position which clamps line 12. An extension arm, not shown, but similar to arm 120 of FIG. 3 will provide additional stability against which a pull upon cam arm 34 may react.

Figure 4:
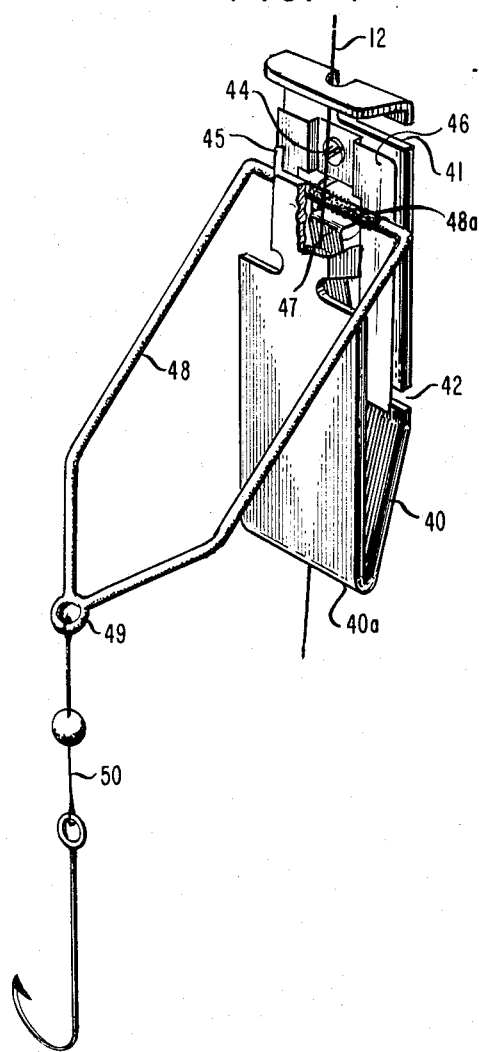
FIG. 4 is a perspective view partially cutaway of another embodiment of the invention in the unclamped condition.
Figure 4B:
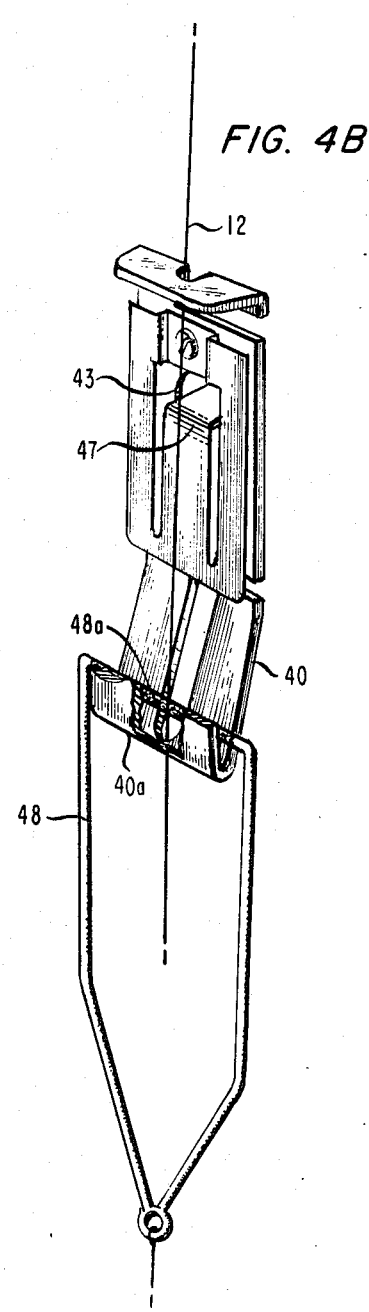
FIG. 4B is a cutaway perspective view of the embodiment of FIG. 4 showing the clamped condition.
Figure 4A:
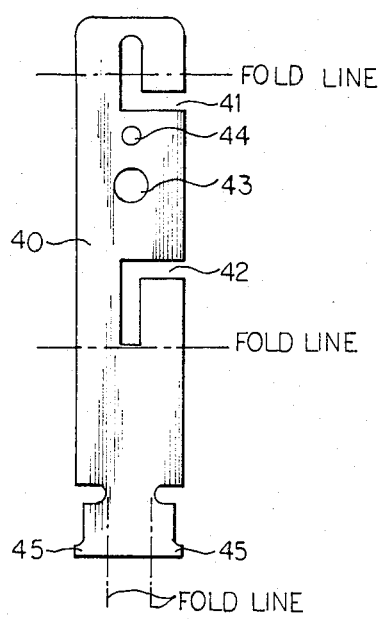
FIG. 4A is an unfolded plane view of one component of FIG. 4.

In FIG. 4, a further embodiment is shown which has a particular advantage in the ease with which the fishing line 12 may be threaded into the line clamp. Referring first to FIG. 4A, an unfolded plane view of slider frame 40 of FIG. 4 is shown. Frame 40 is suitably stamped or cut from a strip of material such as aluminum or steel so as to have slots 41 and 42 entering transversely from an edge and then extending longitudinally in opposite directions. In addition, frame 40 has a large aperture 43, a small rivet hole 44, and a suitable configuration at the end to form tabs 45. Thus, when frame 40 is bent about the indicated fold lines, frame 40 takes the configuration shown in FIG. 4.

By slipping line 12 into slots 41 and 42 and beneath tabs 44 and 45 and drawing the line taunt, line 12 runs longitudinally within frame 40 which is free to slide upon the line, but yet the line cannot move out of the frame. The configurations of slots 41 and 42 are only illustrative of a preferred form and other slot configurations adapted to allow the frame to be readily slipped onto the line and thereafter retained will occur readily to those skilled in the art.

Bimetal element 46 takes the configuration known and readily available on the market as a "Taylor Blade". This blade is stamped and bent from a bimetal sheet so that a central finger 47 moves in and out of the plane of the sheet in response to temperature. A preferred embodiment of the invention uses that blade configuration for which finger 47 is raised from the plane of the sheet in its high temperature condition and retracted into the plane of the sheet in its low temperature condition. When blade 46 is mounted in frame 40 with a rivet through hole 44, and with finger 47 aligned with aperture 43, finger 47 in its high temperature configuration supports the cross member of yoke 48 at a position in the center of frame 40. The lower junction 49 of yoke 48 is connected to the weighted snare 50 of the types described in the preceeding embodiments. When frame 40 slides into water of lower temperature, finger 47 is retracted into the plane of blade 46 as shown in the detail of FIG. 4B and into aperture 43. Thus, yoke 48 is free to fall or to be drawn into the bottom fold 40a of frame 40. At this position, line 12 is wedged between yoke 48 and frame 40. A sleeve of friction material 48a, such as a short length of rubber tube carried by yoke 48, increases the hold upon line 12 and an increased pull upon yoke 48 increases this hold upon line 12.

The "Taylor Blade" as shown is illustrative of a preferred embodiment of the invention. Similarly, the use of yoke 48 as a clamping device is illustrative of a preferred form. However, it should be understood that the principles of the invention may be practiced by another form of bimetallic element which in its first state restrains a clamping means in a first position that is disengaged from the line but which in a second state releases said means so that it engages and holds said line.

It is contemplated that any of the preceeding embodiments of the invention will be marketed with factory set adjustments to correspond to the temperature range of a given species of fish as set forth hereinbefore. Thus, a fisherman would normally acquire a kit of assemblies each appropriately marked to indicate one species of fish and the fisherman would merely select and use that assembly as required without even needing to refer to a table of temperature.

Figure 5A:
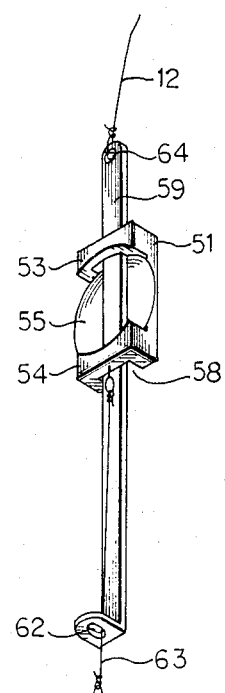
FIG. 5A is a perspective view of a further embodiment of the invention in a clamped condition.
Figure 5B:
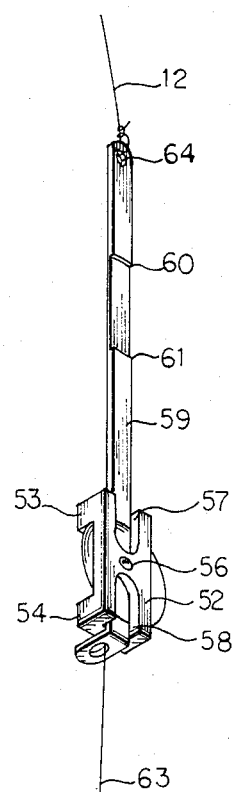
FIG. 5B is a perspective view of the same embodiment as FIG. 5A in a second condition.
Figure 5C:
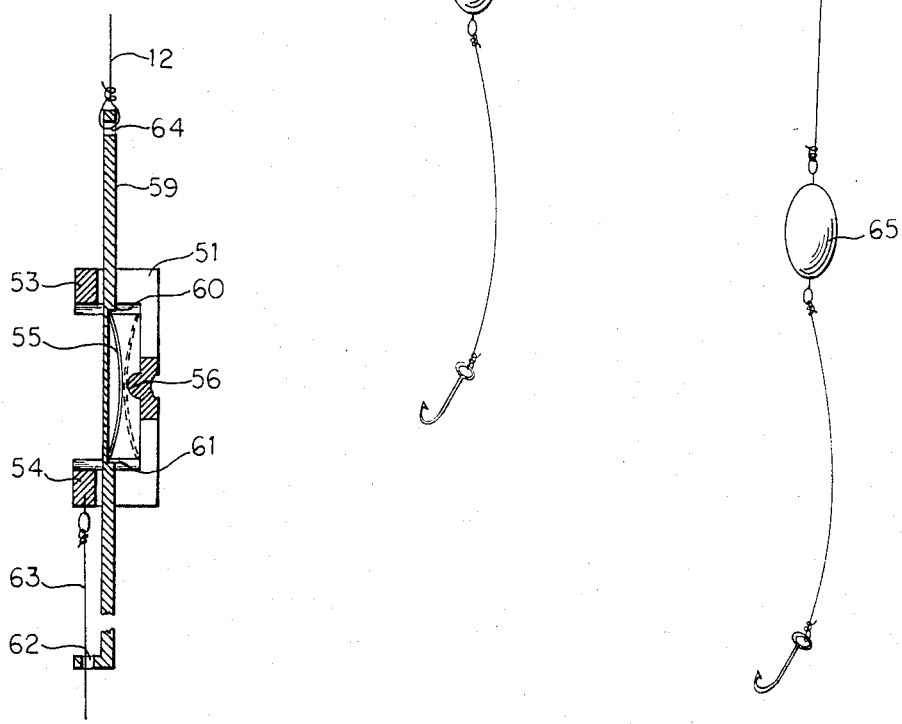
FIG. 5C is a cross sectional view of a critical portion of the structure of FIGS. 5A or 5B.

FIGS. 5A, 5B, and 5C show a particular adaptation of the principles of the invention which is capable of signaling the fisherman when the assembly is lowered into water of the predetermined temperature.

As may be seen by considering the several different views in combination, frame 51, which may be machined or cast from a suitable metal or molded from a suitable plastic, includes a base plate 52 from which extend a pair of fingers 53 and 54. The inner surfaces of fingers 53 and 54 are adapted to receive bimetalic disc 55 by being shaped into curving surfaces each of a radius only slightly larger than the radius of disc 55. Thus when in place, disc 55 is held around a portion of its circumference by fingers 53 and 54 and restrained against any lateral movement. A boss or protuberance 56 in the center of base plate 52 bears against the center of one side of disc 55. Suitably formed apertures 57 and 58 through fingers 53 and 54 allow for the insertion of line extension 59, after disc 55 is in place. Line extension 59 takes the form of an elongated thin strip of metal. Line extension 59 will thereafter hold disc 55 in place against boss 56.

Disc 55 is turned so that its high temperature configuration is concave as viewed from line extension 59 and will in this configuration bear firmly against boss 50 at its center and against line extension 59 at its circumference. Disc 55 will thus engage line extension 59 by way of shoulders 60 and 61 formed by an indentation in line extension 59. When disc 55 snaps into its concave configuration as viewed from boss 56, as shown by the phantom lines in FIG. 6, line extension 59 is disengaged since extension 59 slips freely across the smooth convex surface of disc 55. It will be recalled that such will occur at a lower temperature designed to be equivalent to the feeding temperature of a particular species of fish.

Before proceeding with a detailed examination of the operation of the embodiment of FIGS. 5A, 5B, and 5C, it should be noted that if line 12 is extended through apertures 57 and 58 in place of line extension 59, the embodiment is substantially similar to those hereinbefore described, and, with proper orientation of disc 55, frame 51 will slide down line 12 to the desired water temperature.

The present embodiment on the other hand contemplates that sinker 65 be connected by leader 63 through guide hole 62 in line extension 59 to frame 51 and that line 12 be connected to the end 64 of line extension 59 nearer to shoulders 60 and 61. It should be noted that operation is unchanged if line 12 is connected to frame 51 and leader 63 is connected to end 64.

Before being lowered into the water, disc 55 is seated against shoulders 60 and 61, foreshortening the distance between frame 51 and end 64, all as particularly illustrated in FIG. 5A. As the assembly is lowered into cooler water, disc 55 reverses its configuration at the predetermined temperature and disengages from shoulders 60 and 61. The pull of sinker 65 causes frame 51 to suddenly slide to the far end of extension 59 as particularly shown in FIG. 5B. This sudden movement results in an impulse or elastic wave being sent up the line which can be felt by the fisherman who then knows he has reached water of the desired temperature.

Each of the preceding embodiments has been discussed in terms of means for placing a fishing leader in water of a particular temperature. It should be recognized however that any of them may be used without the leader as a means for determining the depth of water having a particular temperature. Thus, the frame is allowed to slide down the line, in certain embodiments, or is lowered by the line in another embodiment, until the temperature is reached. The line is then pulled up and measured. Fishing may then proceed in the usual fashion at the determined depth.

In all cases, it is understood that the above described arrangement is merely illustrative of one embodiment of the invention and that numerous modifications thereof will readily occur to one skilled in the art.

We claim:

1. In a fishing assembly to be located in a water environment including a sinker in said water and connecting means extending from the surface of said water to said sinker, a frame which encloses a portion of said connecting means to loosely engage said portion, a bimetallic member supported by said frame, said bimetallic member adapted for changing state between two states in response to the temperature of said water environment in which said assembly is located, and means responsive to said change of state of said bimetallic member for engaging said connecting means between said member and said frame in one of said states and for disengaging from said connecting member in the other of said states.

2. The assembly according to claim 1 wherein said bimetallic member is in the form of a disc which in one temperature condition thereof constrains said portion between said disc and said frame.

3. The assembly according to claim 1 wherein said portion comprises a thin strip of rigid material and wherein said bimetallic member is oriented to engage said strip in its higher temperature condition.

4. The assembly according to claim 3 wherein said strip includes indented shoulders to increase the engagement of said bimetallic member.

5. An assembly to be used upon a fishing line in a water environment comprising a frame which encloses a portion of said line to loosely engage said line, a bimetallic member supported by said frame, said bimetallic member adapted for changing state in response to the temperature of said water environment in which said frame is located, and means responsive to a change of state of said bimetallic member for increasing the friction between said line and said frame to firmly engage said line.

6. The assembly according to claim 5 wherein said means responsive to a change of state includes clamping means slideably engaging said line in said first state and rigidly clamping said line in said second state.

7. The assembly according to claim 6 wherein said bimetallic member restrains said clamping means in a first position that is substantially free from friction with said line and in said second state releases said clamping means to move into frictional contact with said line.

8. In a fishing assembly including a line, a sinker, a snare and a leader for said snare, the improvement comprising a bimetallic member adapted for changing state in response to the temperature of the water environment in which a portion of said assembly is located, a frame which partially encloses a portion of said line to loosely engage said line, said frame supporting said bimetallic member, and means responsive to a change of state of said bimetallic member for increasing the friction between said line and said frame to firmly engage said line thereby determining the length of said line to said leader whereby said leader is positioned in water of a predetermined temperature.

9. The assembly according to claim 8, including a yoke received within said frame and connected to said leader, and wherein said bimetallic member in one temperature condition supports said yoke and in the other temperature condition releases said yoke to bind said line between said yoke and said frame.

* * * * *